Aug. 23, 1955     F. C. WALLACE     2,715,802
DISC SANDER

Filed June 7, 1952     2 Sheets-Sheet 1

INVENTOR.
FRANK C. WALLACE
BY
ATTORNEY

Aug. 23, 1955    F. C. WALLACE    2,715,802
DISC SANDER

Filed June 7, 1952    2 Sheets-Sheet 2

INVENTOR.
FRANK C. WALLACE
BY
ATTORNEY

United States Patent Office 2,715,802
Patented Aug. 23, 1955

2,715,802

DISC SANDER

Frank C. Wallace, North Hollywood, Calif., assignor to Collins Radio Company, Cedar Rapids, Iowa, a corporation of Iowa Application June 7, 1952, Serial No. 292,277

3 Claims. (Cl. 51—124)

This invention relates in general to sanding means, and in particular to a disc sander.

It is an object of this invention to provide a sanding machine which utilizes all the surface of an abrasive material and which combines an oscillatory and circular motion.

Another object of this invention is to provide an improved disc sander.

Yet another object of this invention is to provide a sanding machine which continually changes the angle of relative motion between the work-piece and the abrasive surface.

Further objects, features and advantages of this invention will become apparent from the following description and claims when read in view of the drawings, in which;

Figure 1:
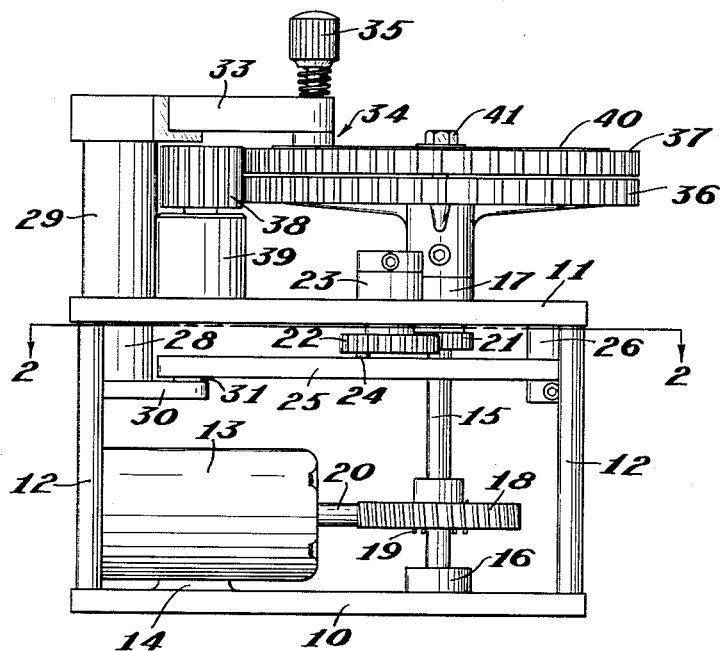
Figure 1 is a side view of the sanding machine of this invention.

Figure 1 illustrates a pair of plates 10 and 11 which are joined by stand-offs 12 and upon which is mounted a suitable driving means 13, as for example, an electric motor, by a bracket 14.

A vertical shaft 15 is rotatably supported in bearings 16 and 17 mounted to plates 10 and 11. A worm gear 18 is carried on shaft 15 and meshes with a worm 19 mounted on shaft 20 of the motor 13.

A small gear 21 is non-rotatably attached to the shaft 15 and meshes with a gear 22 rotatably supported by a bearing 23 which is connected to the plate 11. A pin 24 is mounted off-center of gear 22.

Figure 2:
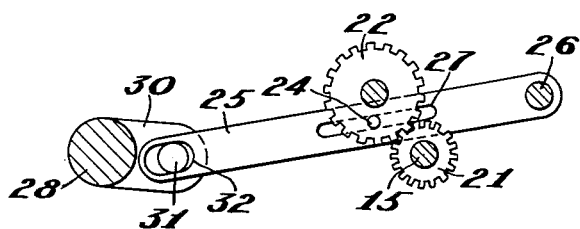
Figure 2 is a sectional view taken on line 2—2 of Figure 1.

A crank arm 25 is pivotally supported by a shaft 26 which is attached to the plate 11. It is formed with a slot 27 intermediate its ends. As best shown in Figure 2, the pin 24 is received in slot 27 to cause the crank arm 25 to oscillate as the gear 22 is turned.

A vertical shaft 28 is rotatably supported in a bearing 29 which is mounted to the plate 11 and has an arm 30 attached to its lower end. The arm 30 has a pin 31 attached thereto which is received in a second slot 32 formed adjacent the end of tthe crank arm 25. Thus, when the gear 22 rotates the motion of the pin 31 in the slot 32 causes the shaft 28 to oscillate. It is to be realized, of course, that the angle through which the shaft 28 oscillates depends upon the relative sizes of the gears and the lengths of arm 30 and crank arm 25. Applicant has constructed a working model in which the shaft 28 swings approximately 90 degrees.

Attached to the upper end of the shaft 28 is an arm 33 which carries at its outer end a disc holding chuck 34 and a disc ejector 35.

A gear 36 is attached to the upper end of shaft 15. A gear 37 is approximately the same size as the gear 36 and is rotatably mounted above the gear 36 on the shaft 15.

An idler gear 38 is supported in a suitable bearing 39 which is attached to the base plate 11. The idler gear meshes with gears 36 and 37. The gears 36 and 37 do not have the same number of teeth. For example, gear 36 might have 240 teeth, whereas gear 37 might have 239 teeth. This causes gear 36 to make 240 revolutions while gear 37 makes 241 revolutions. The purpose of this difference in gearing is to gradually change the position of an abrasive material 40 mounted on gear 37, thus utilizing the whole surface of the abrasive material. A suitable holding means 41 holds the abrasive to the gear face.

Figure 4:
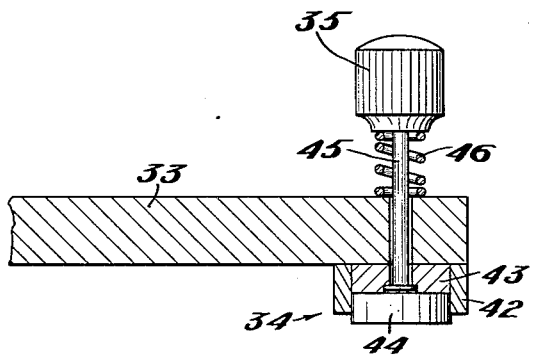
Figure 4 is a detailed view of the disc holding chuck.

The disc holding chuck 34 is shown in detail in Figure 4 and comprises a hollow cylindrical portion 42 and a magnet 43 attached to arm 33. A disc 44 which is to be ground is placed in the cylindrical portion 42 and held by the magnet 43. A plunger 45 extends through the arm 33 and magnet 43. A spring 46 normally biases the plunger upward but when the ejector 35 is pushed downwardly it pushes the disc 44 out of the chuck. The arm 33 may be moved vertically a slight distance so as to allow the disc to be removed from the chuck.

Figure 3:
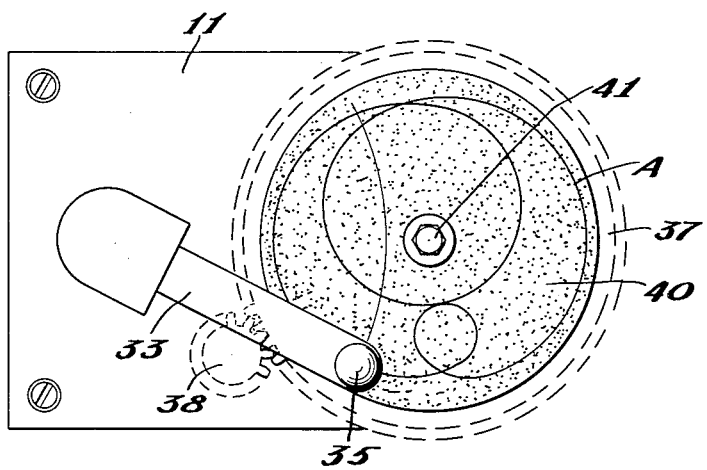
Figure 3 is a top view of the sanding machine.

In operation, a disc is placed in the chuck 34 and the motor 13 started. The motor will cause the arm 33 to oscillate and swing over the surface of the abrasive 40. The gear 37 will rotate and as rotation and oscillation occur the abrasive will move relative to the disc in the path "A" shown in Figure 3. Each time this figure is described the gear 37 will be advanced slightly so that the disc does not re-trace the prior pattern but moves to a new portion of the abrasive. It is to be realized, of course, that the abrasive may be changed when worn out and that both sides of the disc are sanded.

It is seen that this invention provides an improved sanding mechanism wherein an abrasive material is utilized so as to cover its entire surface.

Although this invention has been described with respect to a particular embodiment thereof, it is not to be so limited as changes and modifications may be made therein which are within the full intended scope of the invention, as defined by the appended claims.

I claim:

1. A grinding machine comprising, a base member, a driving means supported on said base member, a vertical shaft rotatably supported in said base member and geared to said driving means, a first gear attached to the upper end of said vertical shaft, an idler gear rotatably supported by the base member and engaging said first gear, a second gear coaxial with and of substantially the same diameter as said first gear, said second gear formed with a different number of teeth than the first gear and rotatably supported adjacent said first gear and engaging said idler gear, an abrasive material attached to the surface of said second gear, a third gear rotatably supported by said base member, a transverse pin extending from said third gear, a fourth gear carried on said vertical shaft in mesh with said third gear, a crank arm pivotally supported by the base member and formed with a slot in which said pin is received, an arm rotatably supported on said base member above said abrasive material, the end of said crank arm linked to said arm to impart oscillatory motion thereto, the free end of said arm formed with a work holding member for holding a workpiece in engagement with the abrasive material.

2. A grinding means for continually changing the point of contact between abrasive material and a workpiece comprising, a base member, a driving means supported on said base member, a vertical shaft rotatably supported in said base member and driven by said driving means, a first gear of relatively large diameter attached to the upper end of said vertical shaft, a second gear of the same diameter as said first gear mounted coaxially with and immediately above said first gear, one of said first and second gears having one more tooth than the other, an idler gear rotatably supported by the base member and in mesh with the first and second gears, a third gear rotatably supported by the base member, a transverse pin extending from said third gear, a fourth gear rotatably supported on the vertical shaft and in mesh with the third gear, a crank arm pivotally supported by said base member and formed with a longitudinal slot in which said pin is received, a second vertical shaft rotatably supported in said base member, an arm attached to the lower end of said second vertical shaft, the free end of said arm being pivotally connected to the free end of said crank arm, an oscillating arm attached to the upper end of said second vertical shaft, a holding chuck attached to the free end of said oscillating arm, and an abrasive material attached to the upper face of said second gear to grind a workpiece in said holding chuck.

3. A grinding means comprising, a base member, a driving means mounted on said base member, a first vertical shaft mounted in said base member and driven by said driving means, a first gear of relatively large diameter rigidly attached to the upper end of said vertical shaft, a second gear of relatively large diameter with a number of teeth different by one from that of the first gear and rotatably supported on the upper end of said vertical shaft, an idler gear rotatably supported by the base member and in mesh with the first and second gears, a second vertical shaft rotatably supported by said base member, an oscillating arm attached to the upper end of said second vertical shaft, an abrasive material attached to the upper face of said second gear, a work holding member at the outer end of said oscillating arm, an arm attached to the lower end of said second vertical shaft, a crank arm pivotally supported by the base member and with its opposite end formed with a slot, a pin attached to said arm and extending through the slot in the crank arm, a third gear rotatably supported by the base member, a second pin extending from said third gear and received in a second slot formed in said crank arm, and a fourth gear mounted on said first vertical shaft and in mesh with said third gear.

References Cited in the file of this patent
UNITED STATES PATENTS

| | | |
|---|---|---|
| 40,303 | Witmer | Oct. 13, 1863 |
| 1,003,816 | Scoville | Sept. 19, 1911 |
| 1,420,751 | Ricketts | June 27, 1922 |
| 1,495,018 | Girard | May 20, 1924 |
| 1,575,156 | Ecaubert | Mar. 2, 1926 |
| 1,798,639 | Tvestmann | Mar. 31, 1931 |
| 1,996,903 | Castonguay | Apr. 9, 1935 |
| 2,115,404 | Spaanbroek | Apr. 26, 1938 |
| 2,225,826 | Duffens | Dec. 24, 1940 |
| 2,404,282 | Fruth | July 16, 1946 |
| 2,570,690 | Kilian | Oct. 9, 1951 |
| 2,606,405 | Ohl | Aug. 12, 1952 |